Patented Aug. 9, 1938

2,126,329

UNITED STATES PATENT OFFICE 2,126,329

AMIDE DERIVATIVES OF ISOXAZOLE CARBOXYLIC ACIDS

Max Hoffer, Basel, Switzerland, assignor to Hoffmann-La Roche Inc., Nutley, N. J., a corporation of New Jersey No Drawing. Application January 25, 1937, Serial No. 122,321. In Switzerland March 20, 1936

4 Claims. (Cl. 260—43)

As shown in my copending application Serial No. 62,381, filed February 4, 1936, amide derivatives of isoxazole carboxylic acids are obtained by the conversion of compounds of the general formula:—

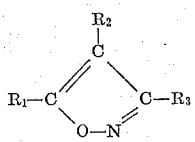

in which one of the residues $R_1$, $R_2$, $R_3$ indicates a carboxyl group, the remainder alkyl residues or hydrogen, into reactive acid derivatives, e. g., into acid chlorides and allowing these compounds to react with secondary amines, dialkyl substituted amides of isoxazole carboxylic acids having valuable therapeutic properties are obtained.

It has now been found that other compounds with an imino group capable of being acylated also form amide-like compounds with isoxazole carboxylic acids which exert a pronounced action as circulatory stimulants. Secondary amines of the aromatic series, compounds with an imino group as part of the heterocyclic ring, as well as mono-substituted urethanes are examples of such imino compounds.

For the manufacture of the new compounds reactive derivatives of isoxazole carboxylic acids, such as acid chlorides, are caused to react with the required imino compounds, if necessary in presence of a solvent capable of combining with acids or in presence of alkali.

The new compounds are to be used in medicine.

Example 1

159 parts by weight of 3,5-dimethyl-isoxazole-4-carboxylic acid chloride, diluted with 500 parts by weight of ether, are added dropwise to a solution of 214 parts by weight of mono-methyl aniline in 200 parts by weight of ether while cooling and stirring. The mixture is then shaken, first with water, and then with dilute hydrochloric acid. After drying the ether layer with anhydrous sodium sulfate and evaporating the ether the product is distilled in vacuo. The methyl anilide of the 3,5-dimethyl-isoxazole-4-carboxylic acid having the structural formula

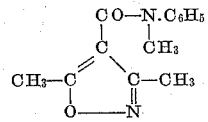

distils over as a viscous oil at 198° C. under a pressure of 11 mm. and, after some time, sets to prismatic crystals melting at 42–43° C. It is easily soluble in alcohol, ether or benzene, difficultly soluble in water.

Example 2

145 parts by weight of 5-methyl-isoxazole-3-carboxylic acid chloride are caused to react with 214 parts by weight of methyl aniline as described in Example 1. After distilling off the ether, a syrup, which soon crystallizes, remains. Purification may be effected by recrystallizing the methyl anilide of 5-methyl-isoxazole-3-carboxylic acid having the structural formula

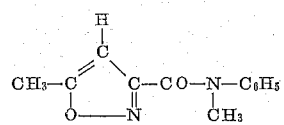

from a little benzene. In this manner it is obtained in the form of colourless prisms melting at 76–77° C., which are easily soluble in alcohol or ether, difficultly soluble in water.

Example 3

While cooling and stirring, 159 parts by weight of 3,5-dimethyl-isoxazole-4-carboxylic acid chloride are dropped into a mixture of 121 parts by weight of methyl-benzyl-amine, 500 parts by weight of ether and 250 parts by weight of a 20 per cent. solution of caustic soda. The ether layer is removed, dried and the ether distilled off. The residue distils at 216–217° C. under a pressure of 11 mm. The methyl-benzyl-amide of 3,5-dimethyl-isoxazole-4-carboxylic acid having the structural formula

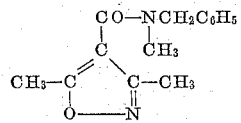

is obtained in the form of a viscous yellowish oil, which soon solidifies to crystals. It melts at 51–52° C., dissolves readily in alcohol, ether and benzene, but with difficulty in water.

Example 4

159 parts by weight of 3,5-dimethyl-isoxazole-4-carboxylic acid are caused to react with 226 parts by weight of p-dimethylamino-phenyl-benzyl-amine in a manner analogous to that described in Example 3. Into the ethereal solution of the p-dimethylamino-phenyl-benzene-amide of the 3,5-dimethyl-isoxazole-4-carboxylic acid thus obtained dry hydrochloric acid having the structural formula

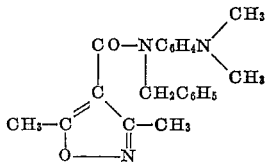

gas is introduced. Thereby, the hydrochloride of the base precipitates and soon becomes crystalline. It melts at 198–199° C. and is soluble in n/1000 acid forming a clear solution. The free base melts at 76° C.

Example 5

159 parts by weight of 3,5-dimethyl-isoxazole-4-carboxylic acid chloride are added dropwise to a solution of 141 parts by weight of vinyldiacetoneamine in 200 parts by weight of pyridine. After standing for 2 hours, the product is heated on the water bath for 30 minutes. On addition of ice the vinyldiacetoneamide of the 3,5-dimethyl-isoxazole-4-carboxylic acid having the structural formula

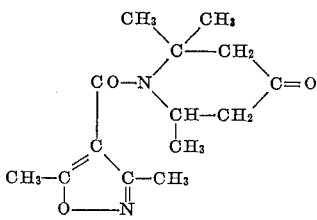

separates in the crystalline state. It crystallizes from dilute acetic acid and then melts at 116–117° C.

Example 6

To a cooled and stirred mixture of 97 parts by weight of 2-methyl-piperidine, 500 parts by weight of benzene and 200 parts by weight of a 20 per cent. solution of caustic soda, 159 parts by weight of 3,5-dimethyl-isoxazole-4-carboxylic acid chloride are added dropwise. The benzene layer is removed, dried with anhydrous potash and the residue remaining after distilling off the benzene distilled in vacuo. The 3,5-dimethyl-isoxazole-4-carboxylic-acid- 2'-methyl-piperidide having the structural formula

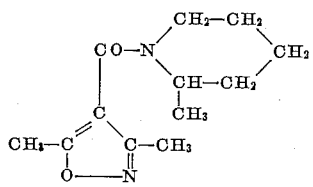

melts at 40–41° C.; it distills as a light-coloured viscous oil at 189–191° C. under a pressure of 11 mm. and possesses a pronounced action as a circulatory stimulant.

Example 7

159 parts by weight of 3,5-dimethyl-isoxazole-4-carboxylic acid chloride are caused to react with 109 parts by weight of 2,6-dimethyl-piperidine in the manner described in Example 6. The resulting 3,5-dimethyl-isoxazole-4-carboxylic-acid-2'-6'-dimethyl-piperidide having the structural formula

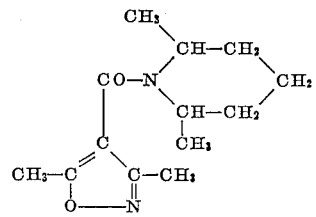

is distilled at 192–195° C. under a pressure of 11 mm. It is an oil difficultly soluble in water. The action as a circulatory stimulant is about the same as that of the methyl piperidide.

Example 8

159 parts by weight of 3,5-dimethyl-isoxazole-4-carboxylic acid chloride are made to react upon 117 parts by weight of ethylcarbamic acid ethyl ester as described in Example 5. The 3,5-dimethyl-4-isoxazolyl-N-ethyl-urethane having the structural formula

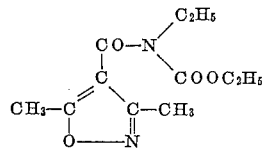

is obtained in needles melting at 117–118° C.

I claim:

1. As a medicinal remedy a compound of the general formula

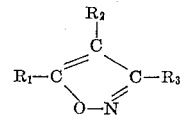

wherein one of the radicals $R_1$—, $R_2$— and $R_3$— represents the group Z.CO— wherein Z is selected from the group consisting of

wherein X is an alkyl radical and Y is selected from the group consisting of an aryl radical of the benzene series, an aralkyl radical of the benzene series and a carboxylic lower aliphatic ester radical and T:N— wherein T: represents an alkylene radical forming a heterocyclic ring with the N, and the remaining R radicals are selected from the group consisting of hydrogen and lower alkyl hydrocarbon radicals of the methane series, which compound acts as a circulatory stimulant.

2. As a medicinal remedy for use as a circulatory stimulant the methyl anilide of 3,5-dimethyl-isoxazole-4-carboxylic acid, melting at 42–43° C. and distilling as a viscous oil at 198° C. under a pressure of 11 mm.

3. As a medicinal remedy for use as a circulatory stimulant 3,5-dimethyl-isoxazole-4-carboxylic acid-2',6'-dimethyl-piperidide, which distills at 192–195° C. under a pressure of 11 mm.

4. As a medicinal remedy for use as a circulatory stimulant the 3,5-dimethyl-isoxazole-4-carboxylic-acid-2'-methyl-piperidide melting at 40–41° C., distilling as a light-coloured viscous oil at 189–191° C. under a pressure of 11 mm.

MAX HOFFER.